United States Patent [19]

Moy

[11] Patent Number: 5,230,048

[45] Date of Patent: Jul. 20, 1993

[54] DATA PROCESSING SYSTEM WITH TREE AND LIST DATA STRUCTURE

[75] Inventor: Diana Y. Moy, Wayland, Mass.

[73] Assignee: Wang Laboratories, Inc., Lowell, Mass.

[21] Appl. No.: 657,250

[22] Filed: Feb. 15, 1991

Related U.S. Application Data

[60] Continuation of Ser. No. 274,529, Nov. 21, 1988, abandoned, which is a division of Ser. No. 983,495, Sep. 3, 1986, abandoned.

[51] Int. Cl.$^5$ ............................................. G06F 15/40
[52] U.S. Cl. .......................... 395/600; 364/DIG. 1; 364/282.1; 364/283.4; 364/283.1; 364/282.3
[58] Field of Search ................... 395/600, 700

[56] References Cited

U.S. PATENT DOCUMENTS

| | | | |
|---|---|---|---|
| 4,330,822 | 5/1982 | Dodson | 364/200 |
| 4,468,728 | 8/1984 | Wang | 364/200 |
| 4,571,679 | 2/1986 | Russell et al. | 364/900 |
| 4,571,699 | 2/1986 | Herzog et al. | 364/900 |
| 4,621,339 | 11/1986 | Wagner et al. | 364/900 |
| 4,677,550 | 6/1987 | Ferguson | 364/200 |
| 4,677,588 | 6/1987 | Benjamin et al. | 364/900 |
| 4,815,030 | 3/1989 | Cross et al. | 364/900 |

OTHER PUBLICATIONS

"Vol. 1/Fundamental Algorithms—The Art of Computer Programming Second Edition", Donald E. Knuth, Addison-Wesley Publishing Company, 1973, 1968, §2.2.4, pp. 270-276.

"Vol. 3/Sorting and Searching—The Art of Computer Programming", Donald E. Knuth, Addison-Wesley Publishing Company, 1973, §6.2.2, pp. 422-428.

Primary Examiner—Kevin A. Kriess
Attorney, Agent, or Firm—Michael H. Shanahan

[57] ABSTRACT

A multitask multiuser system provides for efficient transfer of data from a remote data base to individual subscribers and has particular utility in the distribution of stock market data. A primary provider distributes the incoming data directly to user tasks or to an inquiry provider or a monitor provider. The inquiry provider responds to specific inquiries by users for information in the data base. The monitor provider maintains lists of information which are being monitored by the host computer for individual users. The inquiry provider and the monitor provider do not repeat requests to the remote data base where a similar request is already pending from another user. Data transfer paths between task are established by a code module which may be linked to any of the tasks. The transfer paths are established using information from a configuration list and they are monitored by the operating system through a wait list established for each user tasks. Providers in the system may establish subscriber lists through the code module.

12 Claims, 7 Drawing Sheets

PRIMARY PROVIDER

| CONFIGURATION LIST | | | | WAIT LIST | |
|---|---|---|---|---|---|
| SERVICE | ACCESS | PROV. MAILBOX | SUBSCR. LIST POINTER | PROV. MAILBOX | WAIT STATUS |
| cf | P | cfcf | * | 12em | A |
| MM | P | MMMM | * | cfcf | A |
| NR | P | NRNR | * | MMMM | A |
| ad | Y | adad | | NRNR | A |
| qt | P | qtqt | * | adad | A |
| Otk | P | tktk | * | qtqt | A |
| dj | P | djdj | * | tktk | A |
| rt | P | rtrt | * | djdj | A |
| nh | P | nhnh | * | rtrt | A |
| bt | N | btbt | | nhnh | A |
| sl | N | slsl | | 12tm | I |
| mm | N | mmmm | | | |
| nr | N | nrnr | | | |

SUBSCRIBER LISTS

| cf | MM | NR | qt | tk | dj | rt | nh |
|---|---|---|---|---|---|---|---|
| 13cf | 13MM | 14NR | 20qt | 20tk | 20dj | 20rt | 20nh |
| 14cf | | | | 22tk | 22dj | 22rt | |
| 20cf | | | | | | | |
| 22cf | | | | | | | |

*Fig. 2*

USER 2

| CONFIGURATION LIST | | | USER MAILBOX | WAIT LIST | |
|---|---|---|---|---|---|
| SERVICE | ACCESS | PROV. MAILBOX | | USER MAILBOX | WAIT STATUS |
| cf | Y | cfcf | 20cf | 20em | A |
| MM | N | MMMM | | 20qt | I |
| NR | N | NRNR | | 20tk | A |
| od | N | odod | | 20dj | I |
| qt | Y | qtqt | 20qt | 20rt | I |
| Otk | Y | tktk | 20tk | 20nh | A |
| dj | Y | djdj | 20dj | 20mm | A |
| rt | Y | rtrt | 20rt | OTHER EVENTS | |
| nh | Y | nhnh | 20nh | ws | A |
| bt | N | btbt | | us | A |
| sl | N | slsl | | tm | I |
| mm | Y | mmmm | 20mm | | |
| nr | N | nrnr | | | |

*Fig. 3*

| Key | Terminal ID | Task No. | Status | Workstations restricted | list | Services list |
|---|---|---|---|---|---|---|
| PRIPRO | 00000 | 012 | BG | from | * | * |
| INQPRO | 00000 | 014 | BG | from | * | * |
| MONPRO | 00000 | 013 | BG | from | * | * |
| ADMIN | 00000 | 029 | 014 | to | * | * |
| USER1 | A1074 | 019 | 023 | to | * | * |
| USER2 | A1075 | 020 | 024 | from | * | * |
| USER3 | A1077 | 022 | BG | to | * | * |

| Key | Services list internal | | | | services available to users | | | | | | | | | | | | | |
|---|---|---|---|---|---|---|---|---|---|---|---|---|---|---|---|---|---|---|
| | cf | MM | NR | od | qt | tk | dj | rt | nh | bt | sl | mm | nr | | | | | |
| PRIPRO | P | P | P | Y | P | P | P | P | P | N | N | N | N | | | | | |
| INQPRO | Y | N | Y | Y | N | N | N | N | N | N | N | N | P | | | | | |
| MONPRO | Y | Y | N | Y | N | N | N | N | N | P | P | P | N | | | | | |
| ADMIN | Y | Y | Y | P | Y | Y | Y | Y | Y | Y | Y | Y | Y | | | | | |
| USER1 | Y | N | N | N | Yn | Yn | N | N | N | Yy | Yy | Yy | Yy | | | | | |
| USER2 | Y | N | N | N | Yy | Yy | Yy | Yy | Yy | N | N | Yy | N | | | | | |
| USER3 | Y | N | N | N | N | Yy | Yy | Yy | N | Yn | N | Yn | Yn | | | | | |

*Fig. 4*

| Description | Type | Length | Remarks |
|---|---|---|---|
| return mailbox | text | 4 | sender's mailbox for this service, or spaces if sender is provider |
| flag | text | 1 | application dependent |
| message | text | varies | |

*Fig. 5A*

| Description | Type | Length | Remarks |
|---|---|---|---|
| return mailbox | text | 4 | sender's mailbox for this service, or spaces if sender is provider |
| flag | text | 1 | "s" for subscription, or "c" for cancellation |
| task | binary | 2 | task number |
| user id | text | 3 | extracted by API |
| key | text | 8 | key |

DATA PROCESSING SYSTEM WITH TREE AND LIST DATA STRUCTURE

This is a continuation of co-pending application Ser. No. 07/274,529 filed on Nov. 21, 1988, which is a divisional of Ser. No. 06/983,495 filed Sep. 3, 1986 both abandoned.

BACKGROUND OF THE INVENTION

Local computers are able to gain access to large volumes of information by communicating over telephone lines with remote data bases. The remote data base has storage capabilities which far exceed that which would be feasible at most local computers and can serve as a central storehouse of information.

A data base that was developed by the Walsh, Greenwood Information Systems, Inc. and which is now maintained by Wang Financial Information Services Corporation is dedicated to information relating to the stock market and other financial institutions. It contains real time trade and quote information including over-the-counter, option, commodity, futures, and fixed income data, as well as news and institutional holdings. The data base allows a subscribing computer to have access to three general classes of service: broadcast, inquiry and monitoring.

The broadcast class is that in which information is simply broadcast continuously to the user. An example is the New York Stock Exchange ticker service in which all transactions which occur on the New York Stock Exchange are transmitted to all subscibers as those transactions occur. Other broadcast services include a news headlines service which scrolls through headlines received from the Dow Jones News Service and the Reuters News Service. Finally, the full news items from the Dow Jones News Service and the Reuters New Service are transmitted to subscribers to allow for scrolling through the news items as they are released.

Subcribers to the data base are also able to make specific inquiries. For example, a subscriber may send a request for a quotation on any stock item and promptly receive the current information stored at the data base for that stock item. News items of interest may also be retrieved by making requests which include specific identifier symbols which identify the information of interest.

Finally, a subcriber may request that the remote data base monitor all of the information which enters the data base and transmit only that data which is of particular interest to the subscriber. Again, the subscriber transmits a request to the data base which includes identifier symbols.

The Walsh Greenwood Information Systems system was designed for communication with personal computers; hence for each line address there has been exactly one user. Each personal computer could subscribe to a particular set of services and pay the appropriate fee for those services. Configuration and security were handled by the network host processor sending a message to each computer on each line to indicate which services the network would allow that computer to use. This provided adequate control to permit accurate billing and accounting.

DISCLOSURE OF THE INVENTION

Multiple user systems may have multiple terminals connected through a central computer and a single communication line to the data base host computer. Different users in this local system may subscribe to different services. In that situation, the remote data base must maintain accurate subscription files for each of the terminals. Further, the remote data base must transmit data to all subscribing terminals along a single communications line and rely on the local multiuser system to properly distribute the data to those terminals which have subscribed and which have made specific inquiries. It is to such a multiuser system that the present invention is directed.

To properly distribute incoming data to multiple users, the local multiuser system must maintain subscription records and records of specific requests and must multiplex the incoming data to the individual users. This significant task must be performed without introducing unacceptable delays in transfer of the information from the remote data base to the individual users. The avoidance of delays is particularly critical in the case of stock market information. To provide for this rapid distribution of information, one feature of the present invention is in the handling of different classes of information. Tracking of specific monitoring requests from multiple users can become cumbersome. In accordance with one feature of the present invention, a first provider task divides the incoming data stream from the remote data base into plural data streams according to the data type corresponding to each service. Selected data streams which are in response to nonmonitoring requests are transferred directly to user tasks subscribing to the data streams. A data stream which is in response to a specific monitoring request is, however, transferred to a second provider task. That second provider task then divides the data stream in response to the specific monitoring requests into further data streams and transfers the further data streams to the user tasks. Thus, data which is simply broadcast to the user or which is the result of a specific inquiry need not be delayed by a task which must also handle the more time-consuming distribution of data in response to monitoring requests. The second provider task may also provide the decoding necessary for a particular class of data.

Specific inquiries such as news retrievals may be handled by yet another task. Although that class of data does not require the extensive processing of data based on monitoring requests, the data may require sufficient additional processing to warrant a separate task. However, it is preferred that quotation inquiries be handled by the first provider task. Users are typically concerned with obtaining very rapid responses to quotation inquiries and handling of such inquires by the first provider task is not too burdensome.

Information received from data bases must typically be displayed in a particular format established by the remote data base or by local software provided to all subscribers. Access to the received data by programs developed by the user has typically been limited and, where available, access has required particular programming expertise and effort. Such access has not been available on a real time basis. A further feature of the present invention is that data paths between the provider task and the user task are established by means of a common code module which is linked to each user task. Each data path is specific to a type of data transferred to a single user. The common code module simplifies access to the different data types to which the user has subscribed and also insulates the user program from changes in the operating system of the multitask system. Any programming changes required by changes in the operating system can be handled for all programs by modifying the common code module. By establishing a distinct data path for each type of data transferred to each user, local subscriptions can be readily entered and terminated for specific services and the user program can at any point limit its access to a particular service. Thus, the internal message traffic can be minimized.

The time during which a user program must be active while waiting for data from the data base can be minimized by establishing a wait list which is monitored by the operating system. The wait list includes a mailbox address for each type of data for each user task. Through that mailbox, the operating system notifies the user task of data being transferred to the task. The operating system speeds the distribution of data because it is not necessary for each program to independently cycle through wait routines. Rather, the operating sytem waits for multiple events simulataneously and then deals with whichever one occurs first. Such capabilities are not generally available to programmers writing in higher level languages and are made available in the present system by the common code module.

In establishing the data paths between providers and subscribers, a configuration list may be established for each user task from a configuration file. Each configuration list includes the name of a provider task mailbox to which requests for each type of data are to be transferred and an indication of whether the task has access to a particular type of data. Each configuration list may also indicate whether the task is a provider of data to other tasks. Provider specific routines of the common code module are limited to provider tasks.

The common code module may also be used to establish wait lists for provider tasks. A provider task need not repeatedly check whether requests are being made from user tasks but the operating system may simply monitor the provider task mailbox for each service. A configuration list would also be generated for each provider task so that the provider task would be able to identify each mailbox relative to each service. To facilitate distribution of data to subscribers, each provider may establish a subcriber list relative to each service to identify those users which have established data paths with respect to each service.

Preferably, during system start up, the first provider task is responsible for providing all other tasks in the system with the information included in the configuration list. Only the first provider task has access to configuration files which include the customer access information received from the remote data base.

A provider task such as the above mentioned second provider task should avoid making identical requests for data from the remote data base due to independent requests from different users. To that end, the provider task may receive specific data requests from user tasks and compile information correlating user tasks with specific data requests. For each data request, the provider determines whether a like request is pending for another task. Only if a like request is not pending would a specific data request be transferred to the remote data base. When the data is subsequently received from the remote data base, the provider determines from the compiled information all user tasks which have requested the received data, and the data is transferred to those user tasks. Preferably, the information is compiled by generating a user tree and a symbol tree. Each user node of the user tree points to a list of symbols identifying the data requested by that user. Each node of the symbol tree points to the users which have requested the data represented by the symbol.

BRIEF DESCRIPTION OF THE DRAWINGS

The foregoing and other objects, features and advantages of the invention will be apparent from the following more particular description of a preferred embodiments of the invention, as illustrated in the accompanying drawings.

DESCRIPTION OF A PREFERRED EMBODIMENT

Figure 1:
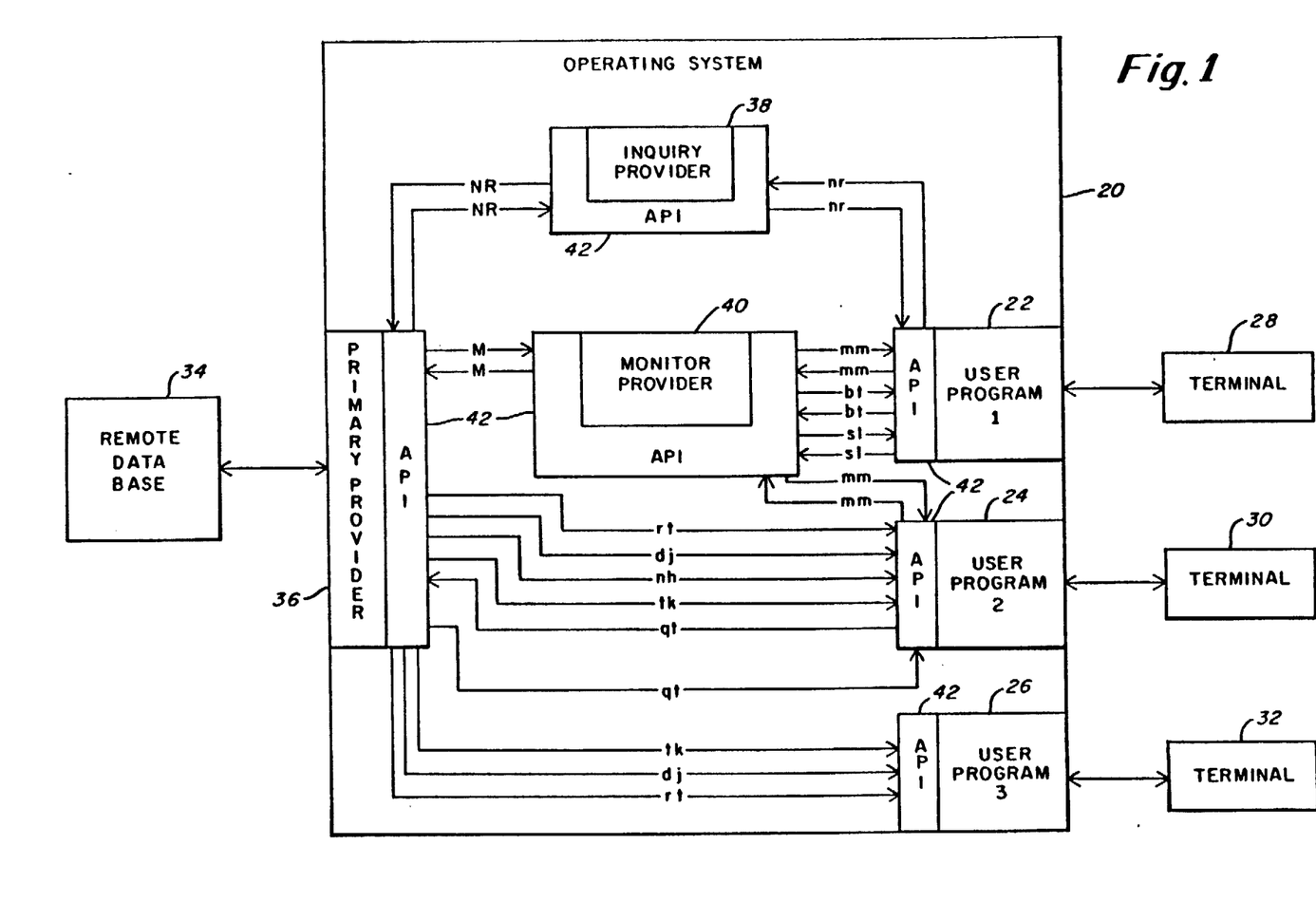
FIG. 1 is a diagram of the software architecture of a system embodying the present invention.

The present invention relates to a multitask, multiuser data processing system and may, for example, be implemented on a VS system from Wang Laboratories, Inc. In FIG. 1, the block 20 represents the overall operating system of the multitask system. Overlayed on the operating system are a number of distinct programs which share the operating system to independently complete their respective tasks. For example, three user programs 22, 24 and 26 are illustrated. Each user program is associated with a respective computer terminal 28, 30 or 32. Within each user program, the multitask, multiuser character of the system is invisible to the user; however, for intertask communications, specific procedures must be followed to establish data paths through the operating system.

The present invention relates to the transfer of requests to and the return of data from a remote data base host computer 34. The host computer gathers real time trade and quotation information over many data lines which link the host to all exchanges and several supplemental services such as Dow Jones and Spectrum Institutional Holdings. This information includes real time stock exchange, over the counter, option, commodity and fixed income data, as well as news and institutional holdings.

All communications between the remote data base 34 and the user programs 22, 24 and 26 are processed through a primary provider task 36. This task provides the data to the subcribing users. The primary provider 36 includes conventional communications software for transferring and receiving data along telephone lines. The primary provider 36 must also make an initial determination as to what type of data is being received. Specifically, the primary provider determines the particular data service of which the data is a part.

The primary provider makes an initial distribution of the data. Most data of the broadcast class, all of which is transmitted to all subscribers of the service, is transferred directly from the primary provider to the individual subcribing users. This class of services includes the Dow Jones New Service (dj), the New York Stock Exchange Ticker (tk), News Headlines (nh) and Reuters New Service (rt). An example of the transfer paths for data from these broadcast services to user programs 24 and 26 are illustrated in FIG. 1. These transfer paths are illustrated as being in only one direction because, once the data path as been established, no further requests from the user program to the remote data base are required. Other data services require more complex logic on the part of the provider. To prevent the primary provider from becoming over-burdened with distribution of data from those services, additional tasks 38 and 40 are provided.

In the present example, much of the data from the inquiry class of services is transferred by the primary provider to an inquiry provider 38. For example, with the Dow Jones New Retrieval Service (nr) the remote data base responds to specific inquiries for news items relating to particular identifiers transmitted to the data base by a user. The inquiry provider 38 initially receives those requests from the user programs, determines whether a similar request is already pending, and if no similar request is pending transfers the request through the primary provider to the remote data base 34. All data transferred back from that service is directed by the primary provider 36 to the inquiry provider 38. The inquiry provider then examines its own records to identify the user program which made the request and transfers the responsive data to just that user program. In the example illustrated in FIG. 1, only user program 22 has subcribed to the Dow Jones News Retrieval Service, but the utility of the inquiry provider increases with increased subscriptions from other user programs and with an increased number of services of the inquiry class.

A final class of service is that in which the host computer monitors data based on a specific request for information identified by identifier symbols. The remote data base monitors all data as it is received from its sources and selects that data for which a request is pending. The data is then transferred to the requesting user. Thus, the monitor class of services keeps an inquiry open as data continues to be received. The monitor provider receives requests from the user programs and, as did the inquiry provider, only forwards requests to the remote data base which are not already pending. The remote data base, for the most part, sees the multiuser system as a single user and only transmits a particular item of data once to the multiuser system. When that data is received it is directed to the monitor provider. The monitor provider searches its records to determine which user program or programs requested the data and transfers the data to those user programs.

Market monitor data is encoded in a compressed format. The primary provider determines only that the data being received is of the market monitoring format and transfers all of that data (MM) in coded format to the monitor provider 40. The monitor provider then decodes the data and directs it to the requesting user programs as one or more of three services. The basic market monitoring service (mm) responds to each price change in that particular stock. A select ticker service (sl) responds to each trade of the stock and identifies the volume and price of that trade. The block trade ticker (bt) identifies all trades which exceed ten thousand shares. Block trade is actually a broadcast class of service but it is encoded by the host computer with the market monitor service, so it is most efficiently decoded by the monitor provider. Further, it is expected that block trading in the future will be a more selective service. As illustrated in FIG. 1, although all three services rely on the same data stream received from the remote data base, user programs may individually subscribe to select ones of the three.

One service which is of the inquiry class but which is handled entirely by the primary provider is that of stock price quotations (qt). Users expect that price quotations will be received very promptly, and the present system facilitates the prompt return of quotation data by minimizing the number of transfers of the quotation requests and return data through the operating system. The two transfers in each direction which result from use of the inquiry provider is avoided. The primary provider transmits the stock quote request with a sequence code which identifies the request in the primary provider. The sequence code is stored with the identity of the requesting user program in a first-in/first-out storage. The remote data base returns the data in the same order in which it is requested and returns the same sequence code with the data. The primary provider then returns the data to the requesting user task as it is identified from the first-in/first-out storage so long as the sequence numbers match. If a sequence number is skipped in the return data, the primary provider is able to either make the request again or notify the user program that the request should be made again.

A basic user program might allow the user to make specific requests within a service to which it subcribes and to suitably display the returned data. However, it is contemplated that users will want to develop their own programs which are particularly suited to their particular needs. In fact, users may wish to develop programs which have as only a small part thereof the need to obtain stock market information. A pension fund management program might be an example of such a program. In the past, retrieval of information from stock market services and other data bases has offered little flexibility to the programmer and has made linking of custom programs to the remote data base difficult or even impossible. The present system facilitates such communications by means of an application program interface (API) which facilitates the establishment of data transfer paths between tasks by making full use of the operating system capabilities while minimizing the programming effort required of the user program.

API is a code module of subroutines which may be linked to any one of the user and provider tasks. Once the API code module has been linked to a user program, the program need only make simple calls to the subroutines to establish the data transfer paths. The user need not be aware of the capabilities and requirements of the underlying operating system because those capabilities and requirements have been taken into consideration in development of the code module. Further, the user program is insulated from changes in the operating system. The system designer will make appropriate changes in the API code module with changes in the operating system. Although the API code module offers its greatest advantages in interfacing user programs to the operating system, it is also used to interface the provider background tasks. With this approach, the system designer, in making changes to the operating system, again need only modify the API code module and need not modify the background provider task.

A further advantage of the particular API code module to be described below is that it makes full use of the intertask message (ITM) capabilities of the Wang VS systems in creating mailboxes and transporting messages to those mailboxes. In the Wang VS systems, a task is able to list ports, or mailboxes, in an operating system plist and then "put itself to sleep". In the present system, those plists are wait lists created by the API code module. The operating system monitors the plist and, when a message is received at a port on the plist, the operating system notifies the task associated with that plist. As a result, the task program need not continue to operate as the program waits for an event to occur. This feature of the operating system is particularly useful to the provider tasks in monitoring data requests from user programs and to user programs in monitoring the receipt of data from the host computer. Such events may occur at any time.

Figure 2:
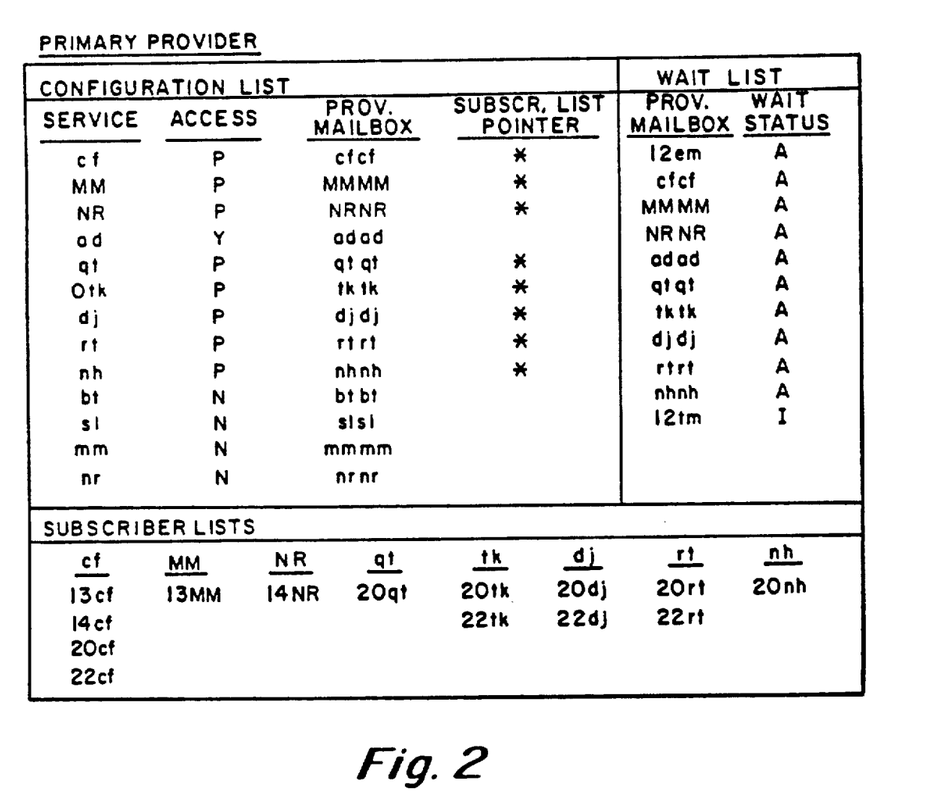
FIG. 2 is an illustration of the configuration list, wait list and subscriber lists stored in a provider task memory by means of an application program interface (API) common code module in the system of FIG. 1.
Figure 3:
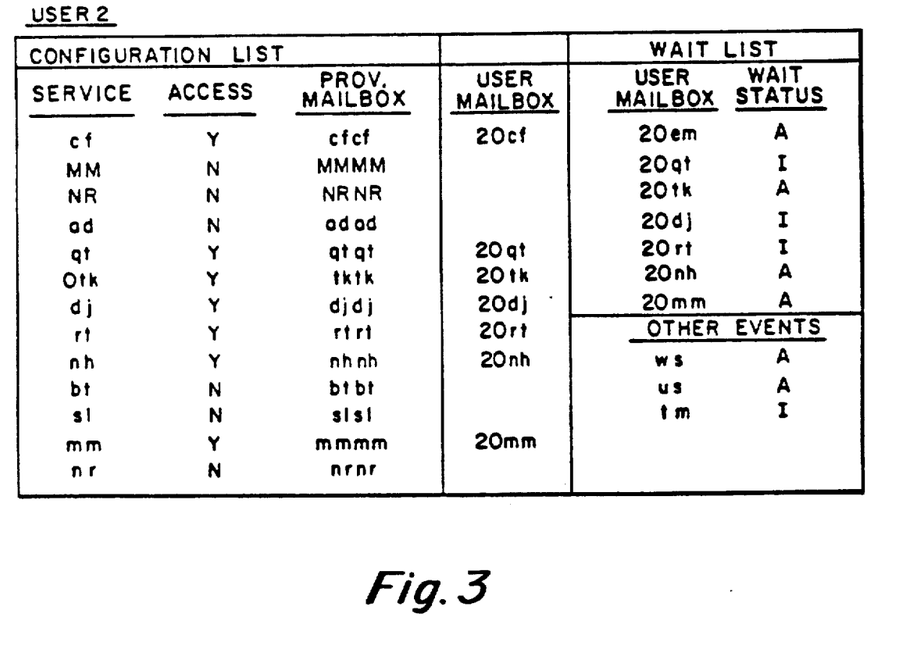
FIG. 3 is an illustration of the configuration list and wait list stored in a user task memory by means of the API.

Intertask communications are handled efficiently by means of the API code module by the establishment of three types of lists. FIGS. 2 and 3 illustrate example lists for the primary provider and user2. Each task which communicates through the API code module establishes a configuration list and a wait list. In addition, each provider task may establish a subscriber list for each service that it provides.

Before establishing any data transfer paths, a provider or user task must first obtain a configuration list through the primary provider. The configuration list includes a service code for each available service. The configuration list also indicates, for each service, whether the particular task is a provider of that service (indicated by a P in the list). If the task is not a provider the list indicates whether the task has access to the service (indicated by Y for yes or an N for no). Each task is also provided with an ITM port, or mailbox address, to which messages requesting that service should be transferred.

Before a user can complete a request to a provider, the provider must have retrieved its configuration list. Based on its access and provider mailbox information provided in that list, the provider must have established itself to receive requests for the particular service by listing the mailbox at which it is to receive requests on its operating system wait list. In FIG. 2, the active status indicated for each service in the wait list indicates that the primary provider is ready to receive requests for each service on the wait list. As already noted, the wait list is an operating system plist in the Wang VS system architecture. Once the wait list has been established, the provider program need not continue to monitor its mailboxes for the respective services. Rather, this chore is handled by the operating system by means of the wait list.

The provider may establish a subscriber list for each service and include in its configuration list a pointer to the starting address of each subscriber list (indicated by an * in FIG. 2).

The user also establishes its wait list in the operating system. The user may establish its own user port for each service to which it has access. That user port then serves as the mailbox for any data returned from a provider. The wait list includes each of its mailboxes on which it expects to receive data. Each mailbox on the wait list may be set at either an active or an ignore status; the operating system will only notify a task of transferred data to those mailboxes which are active.

Figure 5A:
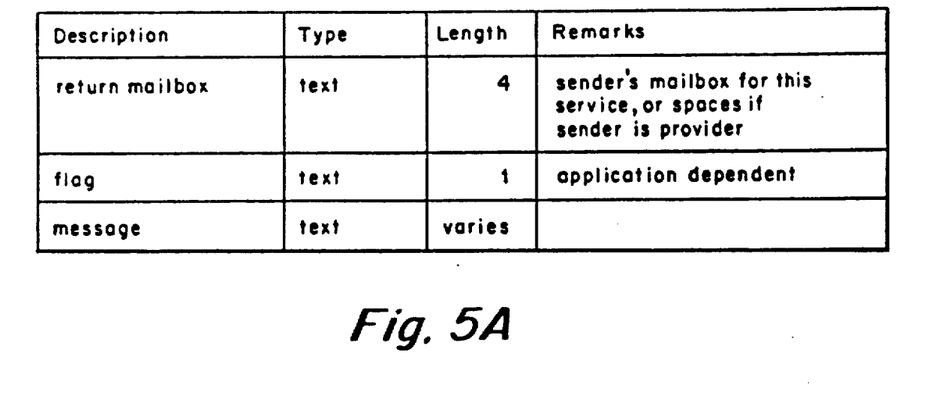
FIGS. 5A and 5B illustrate the message format of messages transferred by means of API.
Figure 5B:
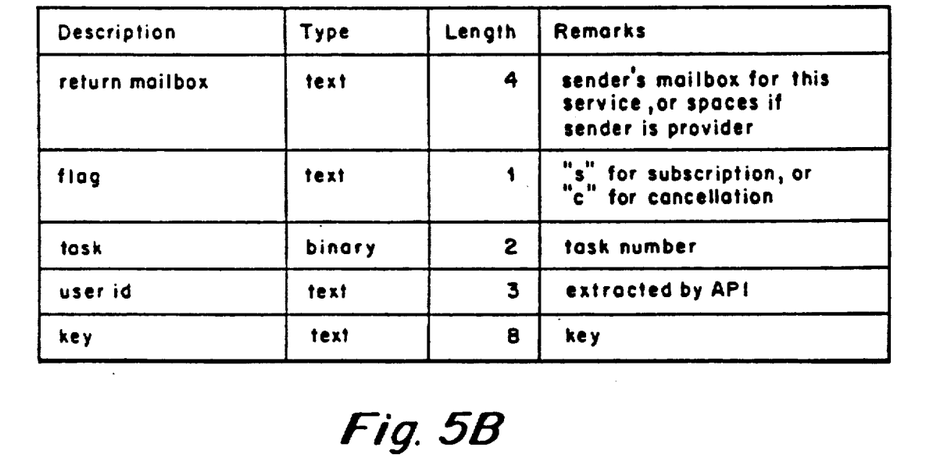

To subscribe to a service, a user looks to its configuration list to obtain a provider mailbox address. It then constructs a subscription message as illustrated in FIG. 5B and transmits that message to the designated provider mailbox. It may then wait to be notified by the operating system through its user port that a message has been received. The message is transferred by the operating system into the provider task mailbox and the provider task is notified that a message has been received. The provider then processes the subscription request and may place the user's return mailbox and other data for that service in the provider's subscriber list for that service. That other data includes the subscriber's workstation number, user I.D. and key.

By defining in the configuration list a unique provider mailbox for each service, the system allows each user program to independently establish data paths for the several services to which it subscribes. Although the host processor may include the particular user program as a customer and thus grant access to data for a particular service, within the local system any user may fail to subscribe or temporarily cancel any subscription to any service at any time without affecting subscriptions to other services. As a result, internal message traffic through the operating system can be minimized. The host processor is not informed of the user's status as a subscriber within the local system, so subscriptions and cancellations within the system do not affect the customer status of the user.

To provide for prompt access to the configuration information, a distinct configuration list is generated for each task in the system. Each task is able to efficiently obtain access to its list without requiring further transfer of data from a configuration file through the operating system. However, in a multitask system in which a global memory is readily available to all tasks, the individual configuration lists may not be required. Rather, the information may be obtained from a centralized file. It is important, however, that each task have ready access to the provider mailbox addresses designated by the system and to its own access information with respect to each available service.

A more detailed description of the creation of the configuration, wait and subscriber lists and the API subroutines which allow for the efficient transfer of data follows.

As the initial receiver of all information from the remote data base, the primary provider 36 has been selected as the focal program for initialization of programs with respect to transfers from the remote data base. As a part of the primary provider's initialization processing, it makes a call to a configuration initialization API routine called CNFINIT. CNFINIT reads a configuration file from disc storage. The primary provider also starts the communication line. When the host computer 34 detects that the line is active, it responds by sending out a services list for customers as discussed below. The primary provider consolidates the information received from the remote data base and from the disc storage to create the configuration file of FIG. 4.

Figure 4:
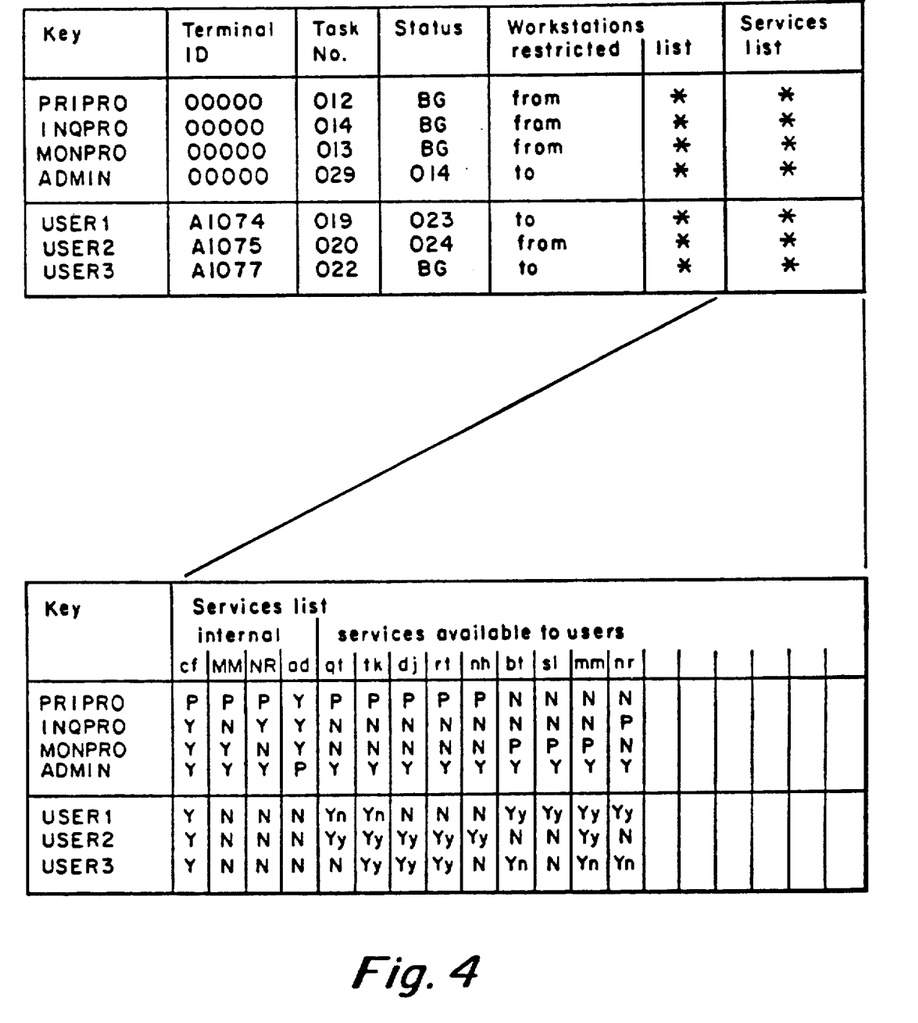
FIG. 4 illustrates a configuration file retrieved by the primary provider task through API.

The first item of the configuration file is a key for each task to be involved in the data transfer. In effect, the key is a logical name for a configuration record for each task. The keys PRIPRO, INQPRO and MONPRO are the names provided for the primary provider, inquiry provider and monitor provider, respectively. A further key ADMIN allows for the implementation of an administrative program if it is required for the particular needs of a system. Such a program may control designation of keys and control access to services by particular tasks and particular workstations.

The programs associated with the first four keys of the file are provider programs which typically operate in background. An additional three keys USER1, USER2 and USER3 are indicated for each of the three user programs shown in FIG. 1. Of course, the system is not limited to three user programs. These programs are typically subscribers and may or may not operate in foreground.

The terminal I.D. field is the identifier by which the remote data base knows each user on a system. The data base grants rights to particular services and bills for those services in a per terminal identification. Only user tasks need terminal I.D.'s since they are the only true consumers of data. Suppliers may be thought of as merely an extension of the remote data base and require no terminal I.D. The terminal I.D. also serves as an alternate key; the remote data base is unaware of the first key and sends its configuration records tagged by the terminal I.D. The terminal I.D.s are assigned by the remote data base when a customer requests new or expanded services.

The task number is forwarded to the primary provider with a key as each task is initialized. The status field indicates whether a key is in use and, if so, the work station number at which the associated task is being used. The status field may indicate that a task is being operated in background. The workstations fields may be used by an administrator program to restrict the workstations on which a given key and its corresponding privileges may be used. The key may be restricted from or to a list of workstations which is simply illustrated by an asterisk in FIG. 4.

The services field is expanded in the lower portion of FIG. 4. This list of fields defines, for each key, the associated program's role with respect to each defined service. The program may have any of three roles in connection with a given service: it may have full subscription privileges (Y); it may be the provider of the service (P); or it may have no rights at all for the service (N). The subscriber rights given by the remote data base may be overruled by a local administrator program as indicated by y, for subscription allowed, and n, for subscription denied. The roles of providers are defined by the system designer.

During CFNINIT, primary provider 36 also obtains a provider mailbox file from disc storage. The provider mailbox for each service is later included in each configuration list of each task as illustrated in FIGS. 2 and 3. Using the information from the provider mailbox file and the configuration file, the primary provider builds a prototype of the configuration list to be used by each task employing the API code module. The prototype configuration list contains one record for each defined service, and each record includes the mailbox, which is the ITM port name, of the provider of the service.

With the configuration file and the prototype configuration list on hand, the primary provider then generates its own personal configuration list by calling SCLINIT. By providing its key PRIPRO, it obtains its configuration list, based on the prototype list, with its access code P, Y or N taken from the configuration file for each service. Where a P is indicated for a service in the configuration list, the provider establishes as its mailbox the provider mailbox indicated in the configuration list. The provider also establishes a subscriber list for each such service and sets the current list size to zero. Further, each mailbox established by the provider program is placed by the API subroutine on an operating system plist for that task which will serve as a wait list. The wait status for each provider mailbox on the wait list is set to active. Finally, the primary provider program calls an API routine SCLWAIT by which it signals the operating system that it will wait for an indication that a message has been received at any of its active mailboxes on the wait list.

With the initialization of the primary provider, other tasks may be initialized. To that end, each task calls the API routine SCLINIT, whereby it establishes an operating system wait list. As illustrated in FIG. 3, a wait list may initially include three pseudoservices emergency (em), workstation (ws) and timer (tm). The emergency port allows the task to receive emergency messages at a high priority on the wait list. The workstation service allows the user program to utilize the wait list established by the API code module to wait for events which are to occur at the workstation terminal. With this pseudoservice, the user program need not delay receipt of data while waiting for an event such as a key stroke to occur at the terminal. Finally, the timer pseudoservice allows the program to set a timer by way of the wait list. Again, it allows the user program to limit the time that it will wait for other events to occur.

During the SCLINIT routine, the task also obtains its configuration list which will provide it with the information required to subscribe to a service in the system. It obtains that configuration list from the primary provider task and, to that end, the API subroutine is provided with a default miniconfiguration list by which every task is configured as a user of configuration data. A user subscribes to the configuration data through a mailbox cfcf to the primary provider.

When the configuration subscription message arrives at the mailbox cfcf of the primary provider, the operating system awakens the primary provider in the SCLWAIT routine. In response to the subscription message for configuration data at its mailbox cfcf, the primary provider uses the user key provided in the message to obtain the appropriate record in the configuration file and mark a copy of the prototype configuration list with the appropriate access code for each service for that key. The primary provider returns the customized configuration list to the subscribing mailbox, for example 20cf, and updates its master configuration file to indicate that the particular key is in use.

Through individual use of the SCLINIT routine, each task may have a full configuration list and a wait list which is empty but for the emergency, workstation and timer pseudoservices. The data paths illustrated in FIG. 1 have not yet been established. To establish the paths, each provider task calls a routine PRVOPEN, by which it establishes a subscriber list which is initially empty. Both provider tasks, automatically during PRVOPEN, and subscriber tasks call a routine SCLOPEN. By the routine SCLOPEN, a provider task sets its mailbox for the service being opened to that indicated in the configuration list, and a subscriber task sets the mailbox to its task number plus the service code, as for example 20qt in FIG. 3. Any future messages to be received by the particular task for that service are received at the designated mailbox.

Some tasks may serve as a subscriber to some services and as a provider of others. For example, the monitor provider serves as a subscriber to market monitoring service MM and as a provider of market monitoring service mm, select ticker service s1 and block trade service bt. Similarly, the inquiry provider is a subscriber to news retrieval service NR and a provider of the distributed news retrieval service nr. Separate SCLOPEN routines must be called for each service.

In the SCLOPEN routine, the mailbox is placed on the wait list for that task but is set to "ignore". A provider task then calls SCLLISTEN, whereby the particular mailbox on the wait list is set to active status. A subscriber task will typically first call a routine SCLSUBSCRIBE. By that routine a subscriber builds a subscription message as illustrated in FIG. 5B and transmits that subscription message to the provider mailbox obtained from its configuration list. The subscription message includes a return mailbox for the service at the subscriber and a flag indicating whether the message is for a subscription or cancellation. The message also includes a task number, a user I.D. and the user's key. The provider to the message by adding the subscriber to the subscriber list for that service. The subscriber then typically enters SCLLISTEN whereby the associated mailbox on the wait list is set to active status.

Data returned to a subscriber mailbox by a provider may be read by entering the API routine SCLREAD in which the user obtains whatever information is then in the mailbox. Usually, however, a user enters the routine SCLWAIT whereby it signals the operating system to notify it when an event occurs at any of its active mailboxes.

Once a user has subscribed to a service, it may make specific requests of the remote data base through its provider by an SCLSEND routine in the API code module. The user program generates a message as illustrated in FIG. 5A which includes its mailbox for the service and a flag and message appropriate for the particular service and request. Under SCLSEND, the provider mailbox is obtained from the subscriber's configuration list and the message is sent. The message is processed by the provider and, in the case of an inquiry provider or monitor provider, the provider might then generate its own message to be transmitted to the primary provider and on to a remote data base. The messages to the primary provider would be sent over paths previously established through the SCLOPEN and SCLSUBSCRIBE routines.

Finally, when data is received by the provider from the host processor 34, the provider must forward the data to its subscribing users. It may call a PRVSEND routine whereby the provider refers to its subscription list for the particular service and sends the incoming data to those subscribers. Alternatively, a provider such as the monitor provider may determine the mailboxes to which the data must be transmitted through its own internal lists.

In addition to the routines thus far described, there are inverse routines such as SCLTERM which is the inverse of SCLINIT, SCLCANCEL which is the inverse of SCLSUBSCRIBE, SCLIGNORE which is the inverse of SCLLISTEN and SCLCLOSE which is the inverse of SCLOPEN.

An additional function SCLLIST allows a user program to add a number of user specified events to the wait list used by SCLWAIT. This pseudoservice (us) like the workstation pseudoservice, allows the user program to avoid further wait processing during which the receipt of incoming data might be delayed.

Figure 6A:
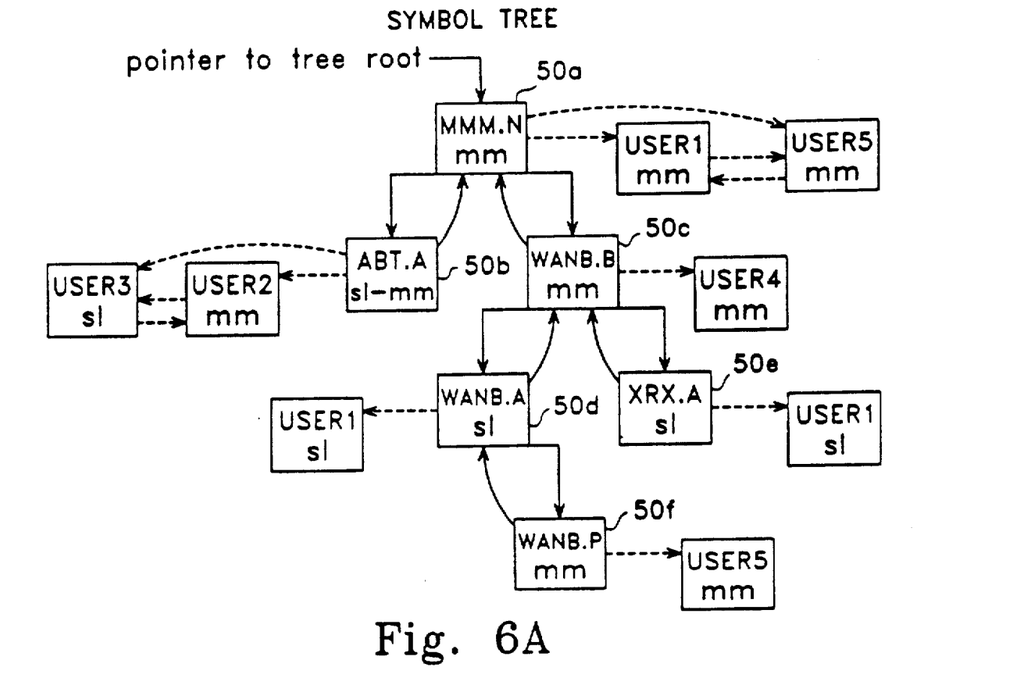
FIGS. 6A and 6B illustrates the data structure of a symbol tree in the monitor provided of FIG. 1.

A more detailed description of the monitor provider task will now be described with reference to FIGS. 6 through 8. The monitor provider must not only maintain a list of subscribers for each of the market monitor, select ticker and block trading services; it must also transfer specific requests, that particular market symbols be monitored (stock market information service request symbols) by the host and correlate the subscriber list with the requested symbols in order that data received from the host can be properly distributed. To that end, the monitor provider relies on a symbol tree (a first tree structure) illustrated in FIG. 6A and a user tree (a second tree structure) illustrated in FIG. 7A. Each tree is a binary threaded tree (solid pointer lines) which additionally includes pointers (broken lines) to linked lists.

In the case of the symbol tree of nodes 50a-f (FIG. 6A), each node of the tree identifies stock market information service request a symbol which serves as an identifier to a particular security which is being monitored (the service). Each node of the tree points to a linked list of users which have requested information with respect to that symbol. In the user tree of nodes 52a-f (FIG. 7A) each node of the tree identifies a subscriber to any of the services from the monitor provider, and each node may point to a linked list of symbols which are being monitored for that user. For each symbol in the list linked to each user node, there is a corresponding symbol node in the symbol tree.

The user tree grows as additional user tasks subscribe to the monitor provider services. The symbol tree grows as the number of specific requests within each service are added. In each case, the initial user to subscribe or the initial symbol to be requested serves as the root of the tree. Thereafter, additional nodes are added to the left or right of a preceding node depending on whether the new node has a lower or higher value. Thus, any symbol which alphabetically precedes the symbol MMM.N at the root of the symbol tree will be found to the left of the tree. With the use of a binary tree, the time required to search the list for a particular item is reduced substantially. This search time is particularly important where as many as 20 users and as many as 50 symbols per user may be listed in the trees.

Figure 6B:
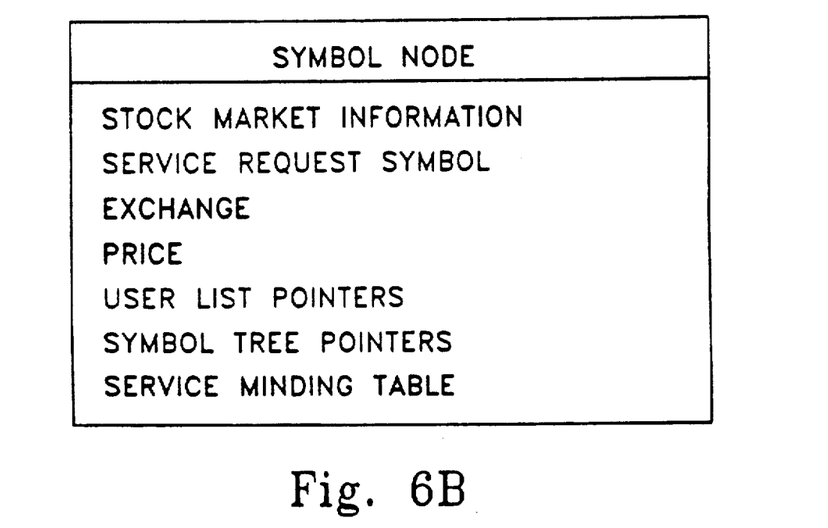
Figure 7A:
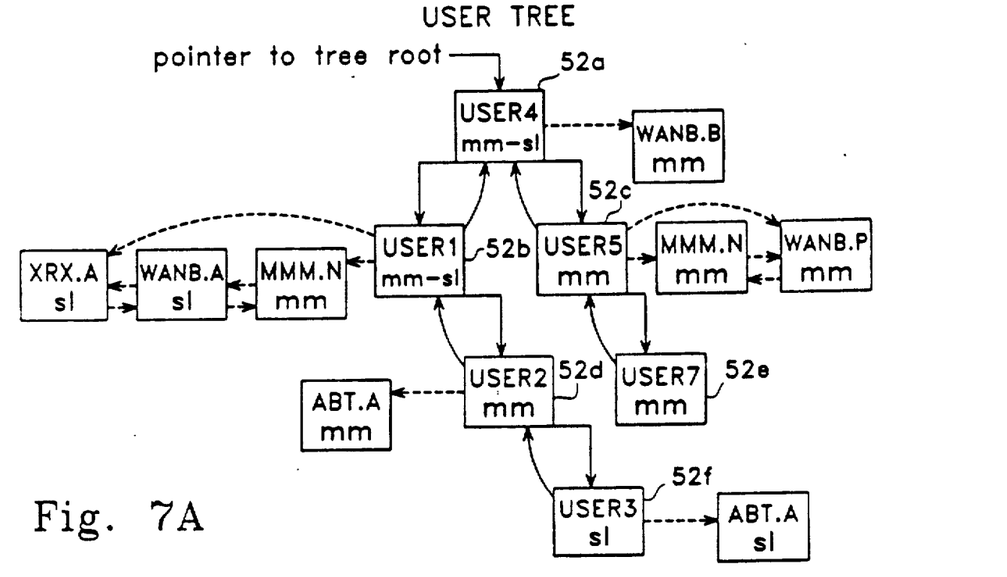
FIGS. 7A and 7B illustrate the data structure of a user tree in the monitor provider.

Each node of the symbol tree includes the information listed in FIG. 6B. Each node includes the security symbol, the exchange on which that security is traded, and the most recent price for that security received from the host. It further includes pointers to the end users on the user list linked to that node. Pointers to and within each linked list are illustrated by broken arrows in FIG. 6A. The linked lists are doubled linked to facilitate adding and deleting nodes from the list. Pointers to the left and right children of each node are provided along with a pointer to the parent of the node. These pointers are illustrated by solid arrows in FIG. 6A. Threading of the tree by the pointers to the parents simplifies restructuring of the tree when symbols are added or removed. Each user node of the linked list includes the service by which the particular user has requested the symbol. A service minding table included in each symbol node identifies all of the services included within its linked user list.

Figure 7B:
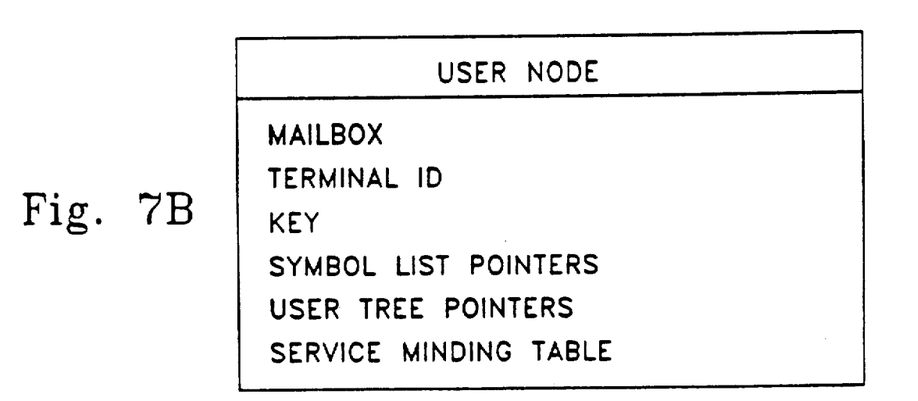
Figure 8:
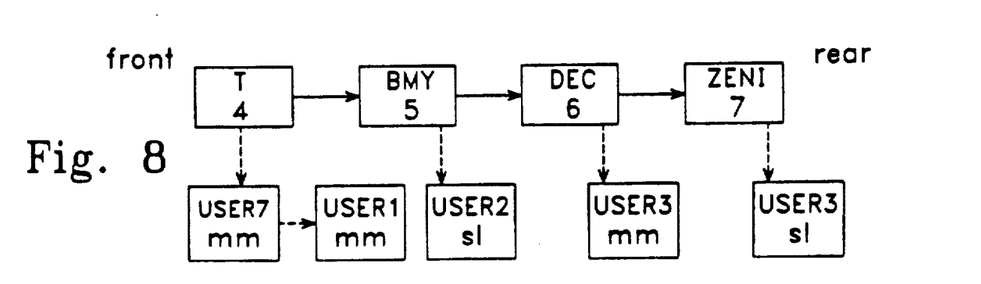
FIG. 8 illustrates an add pending queue in the monitor provider.

Each user node of the user list carries the information presented in FIG. 7B. It includes the return mailboxes identified in the subscriber's subscription message under the routine SCLSUBSCRIBE, the user's terminal I.D. and the user's key. Further, each node includes pointers to the symbol list associated with that node and pointers to the children and parent of the node. Further, the user node includes its own service minding table. This minding table lists all of the services to which the particular user has subscribed. As illustrated by user 7 in FIG. 7A, the particular user need not have specific symbol requests pending to have a user node with as an indication of services in the minding table.

When a user subscribes to a service, through SCLSUBSCRIBE, the monitor provider scans the user tree to determine whether a user node has already been established for that task. If so, the new service to which the task is subscribing is added to the service minding table. If not, a new node is added as a leaf to the tree.

Thereafter, by means of an SCLSEND routine, the task may request that a particular symbol be monitored for that service. Prior to adding the symbol to the tree a request must be transmitted to the host processor and the acknowledgement in the form of a price must be recieved from the host. A request is only transmitted to the host processor if the same symbol within the same service has not previously been requested. To make that determination, the monitor provider first scans the symbol tree for the symbol which is to be requested. If it locates that symbol, it notes the service minding table to determine whether the symbol has been requested for the desired service. If the symbol and service are located in the symbol tree, the user is added to the linked user list to the symbol node, and the symbol is added to the linked symbol list of the user node. If, however, the symbol and service are not located on the symbol tree a request is made to the host.

When the request is made to the host, it is given a sequence number which is transmitted with the request. The host will acknowledge the request on a first-in/first-out basis and return the sequence number. To determine whether an acknowledgement is received, a requested symbol is placed in an add pending queue illustrated in FIG. 8. Each node of the queue points to the next succeeding symbol to be requested. The sequence number is included with the requested symbol. In addition, each node of the queue points to a user node which may be included in a list.

When an acknowledge is received, the symbol node is removed from the queue, and the pointer to the user node is transferred to that symbol's node in the symbol tree. If the symbol does not already have a node in the tree, a node is established. Further, a node in a linked symbol list in the user tree is added for the particular user.

If an acknowledgement sequence number is received out of order, the system assumes that the skipped request was not successful and transmits a new request for the same symbol. The symbol is placed at the end of the add pending queue with a new sequence number. Also, a counter is clocked. The counter allows a request to be retransmitted only three times to avoid an endless loop of requests for a symbol which is not being acknowledged.

When a user requests that a symbol be deleted from its service, the user tree is scanned to locate the user and that symbol is removed from the linked list. Then, the symbol tree is scanned for the symbol and the user is removed from its linked list. Further, as the linked list is scanned to locate the user, it is determined whether that user is the last to include that symbol for a particular service. If so, that service is deleted from the symbol node minding table. Thereafter, in scanning the symbol tree to determine whether a particular service is pending for a symbol, it is not necessary to scan the linked user list because the minding table has been updated. If the deleted user is the last node on the linked user list, the full node is removed from the symbol tree. Also, a delete request is forwarded to the host processor.

If a delete request is not properly received and processed by the host, the system may in the future receive update information which the host expects to be distributed. On scanning the symbol tree to locate the users of that data, no corresponding symbol node will be located. In that event, a delete request is again transmitted to the host processor.

If the symbol is located in the symbol tree when information is recieved from the host, the linked user list is then scanned to identify the users which are to receive the particular data. The data is forwarded to those users at their appropriate mailboxes determined by scanning the user tree.

The user tree is required in order to clear the symbol tree of symbols associated with that user when the user forwards a SCLCANCEL routine. On receipt of the message from that routine, the user tree is scanned for the user and the symbols are identified by scanning the linked symbol list. Thereafter, the symbol tree is scanned for those symbols and the user is removed from the linked user list. Again, if the user is the last user to be linked to that symbol, the symbol is removed from the symbol tree and a delete request is forwarded to the host.

It can be noted that the block trade symbol bt is not included in either of the sample trees. This is because the block trade service is a broadcast service. It is only handled be the monitor provider because it is encoded with the market monitor data. However, as a broadcast service, block trading is readily handled by the API routine PRVSUBSCRIBE by which the user is added to a subscriber list and PRVSEND by which data is distributed to the listed users.

While this invention has been particularly shown and described with references to a preferred embodiment thereof, it will be understood by those skilled in the art that various changes in form and details may be made therein without departing from the spirit and scope of the invention as defined by the appended claims. For example, although the invention is directed primarily to a multitask system in which the tasks are performed in a single processing unit, the tasks may be distributed to other processing units while still incorporating certain features of the invention. Further, the invention has application to nonmarket data.

What is claimed is:

1. A programmed data processing system comprising:
   a read/write memory;
   means for storing in said memory a first tree structure having nodes each representing a datum of a first data type and pointing to a list having elements each representing a datum of a second data type associated with the datum of said first data type represented by that node;

means for storing in said memory a second tree structure having nodes each representing a datum of the second data type and pointing to a list having elements each representing a datum of the first data type associated with the datum of said second data type represented by that node;

a source of successive data of either of said first and second data types; and means, responsive to one of said successive data of one of said first and second data types, for searching the one of said first and second tree structures in said memory having nodes representing data of said one of said first and second data types for the node representing said one of said successive data, and retrieving from the list pointed to by that node a datum of the other one of said first and second data type associated with said one of said successive data.

2. A data structure as claimed in claim 1 wherein the data of the first data type identifies services, and the data of the second data type identifies users of the services.

3. A programmed data processing system as claimed in claim 2 wherein the list having elements each representing a datum of the second data type is a list referencing users that made a service request, and the list having elements each representing a datum of the first data type is a list referencing service requests made by a user.

4. A programmed data processing system as claimed in claim 3 wherein the service requests are requests for stock market information.

5. A programmed data processing system as claimed in claim 3 wherein, for each element of the list having elements each representing a datum of the second data type, there is an associated node of the second tree structure, and for such element of the list having elements each representing a datum of the first data type, there is an associated node of the first tree structure.

6. A programmed data processing system as claimed in claim 1 wherein, for each element of the list having elements each representing a datum of the second data type , there is an associated node of the second tree structure, and for each element of the list having elements each representing a datum of the first data type, there is an associated node of the first tree structure.

7. In a data processing system, a method of storing and retrieving data of one of first and second data types associated with a given datum of the other one of said first and second data types, comprising the steps of:

storing in a memory under control of a processor a first tree structure having nodes each representing a respective datum of the first data type and pointing to an associated list of elements each representing a respective datum of the second data type associated with the respective datum of the first data type represented by that node;

storing in the memory under control of the processor a second tree structure having nodes each representing a respective datum of the second data type and pointing to an associated list of elements each representing a respective datum of the first data type associated with the respective datum of the second data type represented by that node; and searching, in the memory under control of the processor the one of said first and second tree structures having nodes representing respective data of the other one of said first and second data types for the node representing the given datum, and then retrieving from the list associated with that node a datum of the one of said first and second data types associated with the given datum.

8. A method as claimed in claim 7 wherein the data of the first data type identifies service requests and the data of the second data type identifies users that made the service requests.

9. A method as claimed in claim 8 wherein the list having elements each representing a datum of the second data type is a list referencing users that made a service request, and the list having elements each representing a datum of the second data type is a list referencing service requests made by a user.

10. A method as claimed in claim 9 wherein the service requests are requests for stock market information.

11. A method as claimed in claim 9 wherein, for each element of the list having elements each representing a datum of the second data type, there is an associated node of the second tree structure, and for each element of the list having elements each representing a datum of the first data type, there is an associated node of the first tree structure.

12. A method as claimed in claim 7 wherein, for each element of the list having elements each representing a datum of the second data type, there is an associated node of the second tree structure, and for each element of the list having elements each representing a datum of the first data type, there is an associated node of the first tree structure.

* * * * *

UNITED STATES PATENT AND TRADEMARK OFFICE
CERTIFICATE OF CORRECTION

PATENT NO. : 5,230,048
DATED : July 20, 1993
INVENTOR(S) : Diana Y. Moy

It is certified that error appears in the above—identified patent and that said Letters Patent is hereby corrected as shown below:

Column 1, line 5, should read:

--This is a continuation of co-pending application Ser. No. 07/274,529 filed on Nov. 12, 1988, now abandoned, which is a divisional of Ser. No. 06/903,495 filed Sep. 3, 1986.--

Column 15, line 22, "A data structure" should read --A programmed data processing system--.

Signed and Sealed this

Fourteenth Day of June, 1994

Attest:

BRUCE LEHMAN

Attesting Officer     Commissioner of Patents and Trademarks